United States Patent [19]

Nagao et al.

[11] Patent Number: 4,766,966
[45] Date of Patent: Aug. 30, 1988

[54] APPARATUS AND METHOD OF CONTROLLING RATE OF FEEDING PRODUCT TO WEIGHER

[75] Inventors: Takeyoshi Nagao, Kakogawa; Toru Kohashi, Hyogo; Mitsunobu Haraguchi, Kakogawa, all of Japan

[73] Assignee: Yamato Scale Company, Limited, Japan

[21] Appl. No.: 15,623

[22] Filed: Feb. 17, 1987

[30] Foreign Application Priority Data

Mar. 28, 1986 [JP]  Japan .................................. 61-71605

[51] Int. Cl.$^4$ ............................................ G01G 13/02
[52] U.S. Cl. ........................................ 177/123; 177/25
[58] Field of Search .............................. 177/123, 25.14

[56] References Cited

U.S. PATENT DOCUMENTS 4,549,620  10/1985  Dee et al. ...................... 177/25.14 X
4,650,464  3/1987  Ruiz et al. ..................... 177/25.14 X

FOREIGN PATENT DOCUMENTS 60-238723  11/1985  Japan ................................... 177/123

Primary Examiner—George H. Miller, Jr.
Attorney, Agent, or Firm—Senniger, Powers, Leavitt and Roedel

[57] ABSTRACT

An improved apparatus and method for controlling the rate of feeding product to a weigh hopper or cradle by changing the exit aperture of a feeding device in accordance with a characterized condition so that a predetermined amount or weight of product is fed to the weigh hopper or cradle at high accuracy and within a minimum time. The method is especially useful when used in a combination weighing machine.

6 Claims, 4 Drawing Sheets

APPARATUS AND METHOD OF CONTROLLING RATE OF FEEDING PRODUCT TO WEIGHER

This invention relates to an improved method for controlling the rate of feeding product to a weigh hopper or cradle of a weigher so that a predetermined weight of product is fed to the hopper or cradle. This method is especially effective when used in an automatic feeding device of a combination weighing machine.

BACKGROUND OF INVENTION

In an automatic combination weighing machine, each weigh hopper is preferably loaded with a specific weight of product which is previously selected in accordance with a requested target combination combined weight. For the purpose of feeding product to such a weigh hopper, a retaining hopper is generally disposed just above the weigh hopper for retaining some amount of product and discharging its content into the weigh hopper by controlling its exit gate door. The exit gate is generally opened in response to unloading of the weigh hopper and closed in response to detection of a predetermined weight by the weigher. In order to obtain high speed operation, it is desirable to load the weigh hopper as fast as possible. However, if the product is discharged from the retaining hopper at a very high flow rate, a large overshoot of weight value is detected by the weigher and accurate loading is unobtainable.

In order to overcome this overshoot problem so-called triple step loading is widely used at present. In this method, the exit gate aperture is changed three times as shown by G1, G1' and G2 in FIG. 1 corresponding respectively to "rough", "medium" and "fine" feedings. As shown in the drawing, the gate aperture is changed abruptly at times t0, t1, t2 and t3 but, due to the vertical distance between the weigh and retaining hoppers, the response of the weigher is delayed respectively by times L0, L1, L2 and L3 as shown in FIG. 1(b). Also, in this method substantial overshoots as shown by A', B' and C' take place and result in substantial variance in the weight of product in the stabilized weigh hopper with respect to a predetermined target weight Wp. Therefore, it is difficult to determine the difference d between the target weight Wp and weight W3 corresponding to the time t3 at which the retaining hopper gate is to be closed.

Japanese patent opening gazette No. 60-238723 discloses a weigher proposed for overcoming the abovementioned overshoot problem. In the disclosed weigher, the gate aperture Gx between the times t1 and t2 is controlled linearly with respect to the detected weight Wx in accordance with the following equation.

$$Gx = (G1 - G2)\frac{W2 - Wx}{W2 - W1} + G2 \quad (1)$$

FIGS. 2(a) and (b) show the relation between the gate aperture and the detected weight of product fed into this weigher. As seen from FIG. 2(b), the overshoot phenomena A',C' and resultant variance in the final weight still remain.

SUMMARY OF INVENTION

Accordingly, an object of this invention is to provide an improved method of automatically controlling the gate aperture which can minimize the abovementioned overshoot phenomena.

The subject matter of this invention is to control the exit gate aperture of a product feeding device between the times t1 and t2 of FIG. 2 in proportion to a specific power of the difference between the current weight Wx and the weight W2 corresponding to the time T2. In this case, the term "gate aperture" can be substituted with a more general term "flow rate" of product.

DESCRIPTION OF PREFERRED EMBODIMENT

Figure 3:
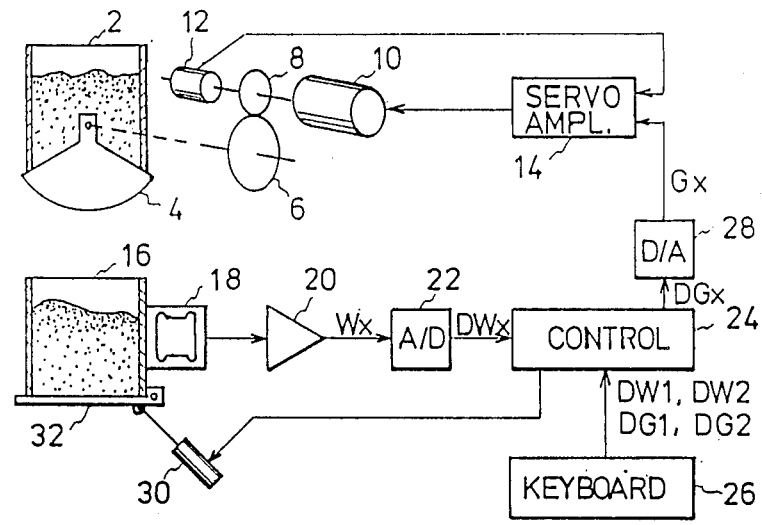
FIG. 3 is a diagram representing a schematic arrangement of a weigher in which the method of this invention is to be embodied.

Referring to FIG. 3, there is shown a schematic arrangement of one of the weighing units of a combination weigher which is also shown in the abovementioned Japanese patent opening gazette and in which the method of this invention is to be embodied. The weighing unit includes a retaining hopper 2 for temporarily retaining product to be weighed which is fed from a suitable feeding device (not shown for simplicity) well known in the art. The retaining hopper 2 has a bottom exit normally closed by a discharge gate 4 whose aperture is continuously controlled through reduction gears 6 and 8 by a servo-motor 10. A rotation detector 12 such as a potentiometer is attached to the shaft of motor 10 for detecting an angle of rotation to provide a signal indicative of the size of the aperture of gate 4. The aperture indicative signal from the detector 12 is applied to a servo amplifier 14.

Figure 1A:
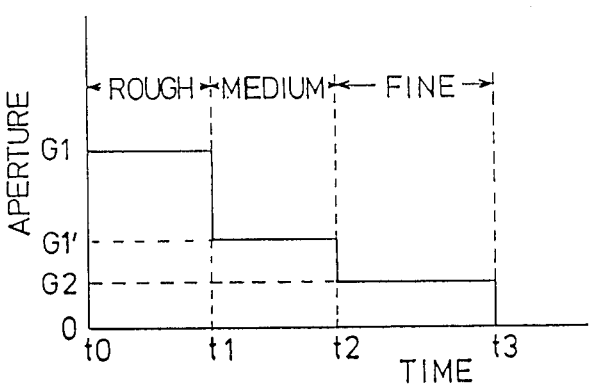
FIGS. 1(a) and (b) and 2(a) and (b) are diagrams representing time-rates of change of the gate aperture and the detected weight value in the abovementioned prior art methods.
Figure 1B:
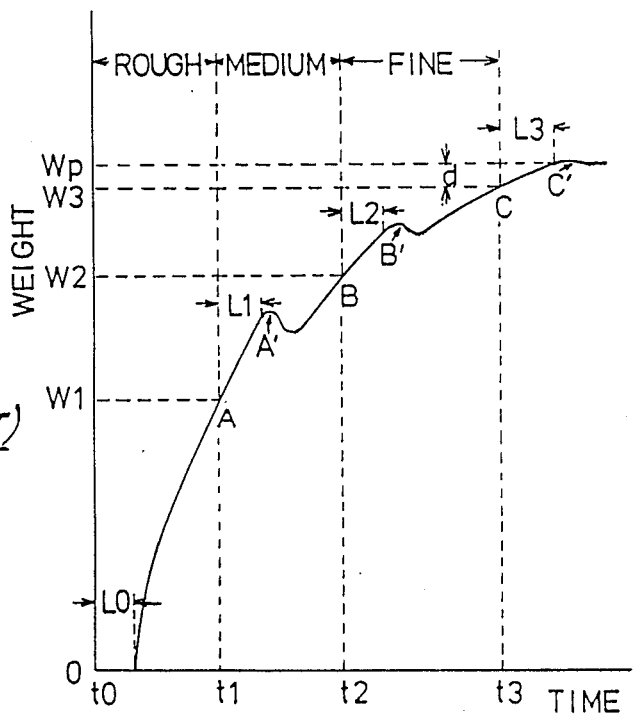
Figure 2A:
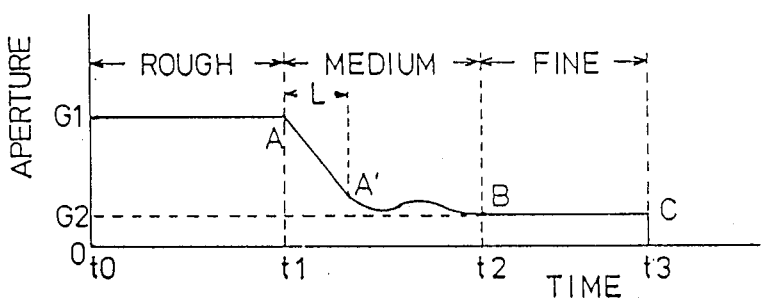
Figure 2B:
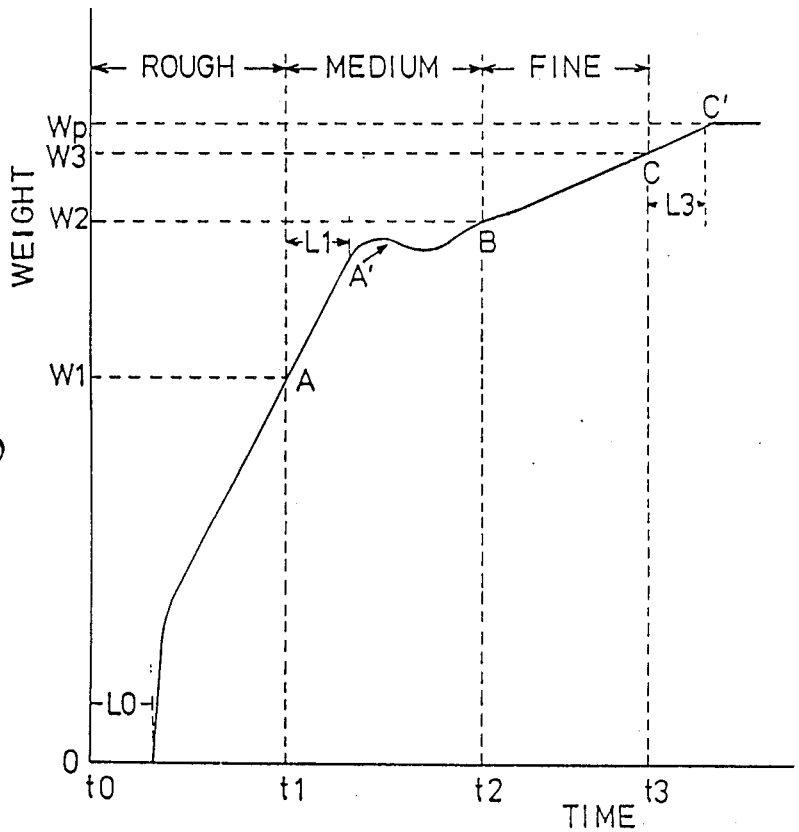

The weighing unit also includes a weigh hopper 16 disposed directly under the retaining hopper 2 for weighing product discharged therefrom. The weigh hopper 16 is associated with a weight sensor 18 such as a load cell disclosed, for example, in U.S. Pat. No. 4,509,610 for sensing the weight of product in the weigh hopper to provide a weight indicative signal Wx through an amplifier 20 to an analog-to-digital (A/D) convertor 22. The A/D convertor 22 converts the signal Wx into DWx of digital form and applies it to a control section 24. The control section 24 also receives digital signals DG1, DG2, DW1 and DW2 respectively corresponding to the analog signals G1, G2, W1 and W2 as described already with reference to FIG. 2 and also shown in FIG. 5 from an input keyboard device 26 and calculates a digital aperture signal DGx based upon the following equation in accordance with this invention.

$$DGx = (DG1 - DG2)\left(\frac{DW2 - DWx}{DW2 - DW1}\right)^n + DG2 \quad (2)$$

where n is a decimal selected from the range of 0 to 1 exclusive, preferably 0.3 to 0.7 inclusive. The resultant signal DGx is applied to a digital-analog (D/A) convertor 28 which converts it into an analog aperture signal Gx which is applied to the servo amplifier 14. The servo amplifier 28 serves to control the servo motor 10 so that the difference between the levels of both input aperture signals becomes zero.

The control section 16 also executes a well-known combination selection operation and applies a discharge command signal to a gate control unit 30, such as an air-cylinder, which controls a discharge gate 32 of each selected weigh hopper to open its gate. The combination selection operation will not be described further since it has no direct connection to this invention.

Figure 4:
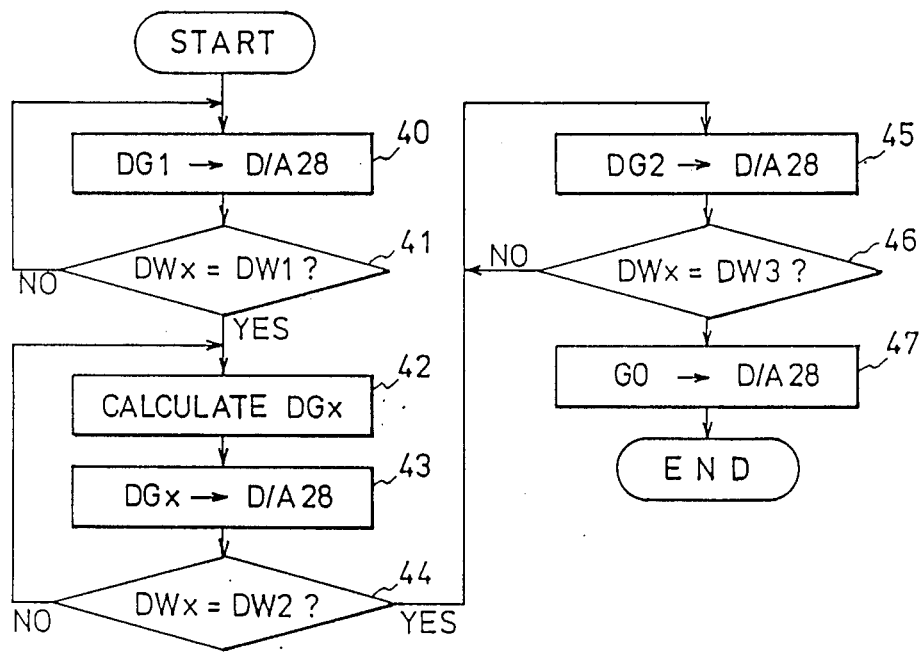
FIG. 4 is a flow chart representing a program used for controlling the weigher of FIG. 3 to execute a process in accordance with the method of this invention.
Figure 5A:
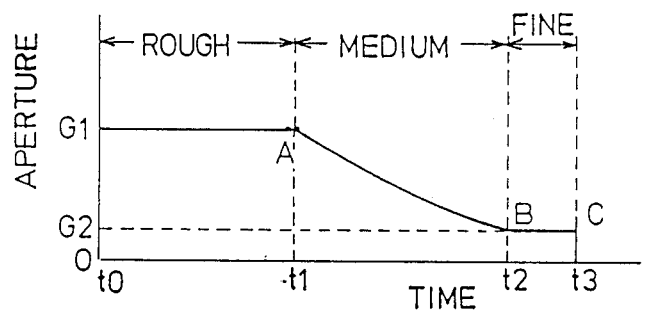
FIGS. 5(a) and (b) are diagrams similar to those in FIGS. 1(a) and (b) and 2(a) and (b) obtained during execution of the program of FIG. 4.
Figure 5B:
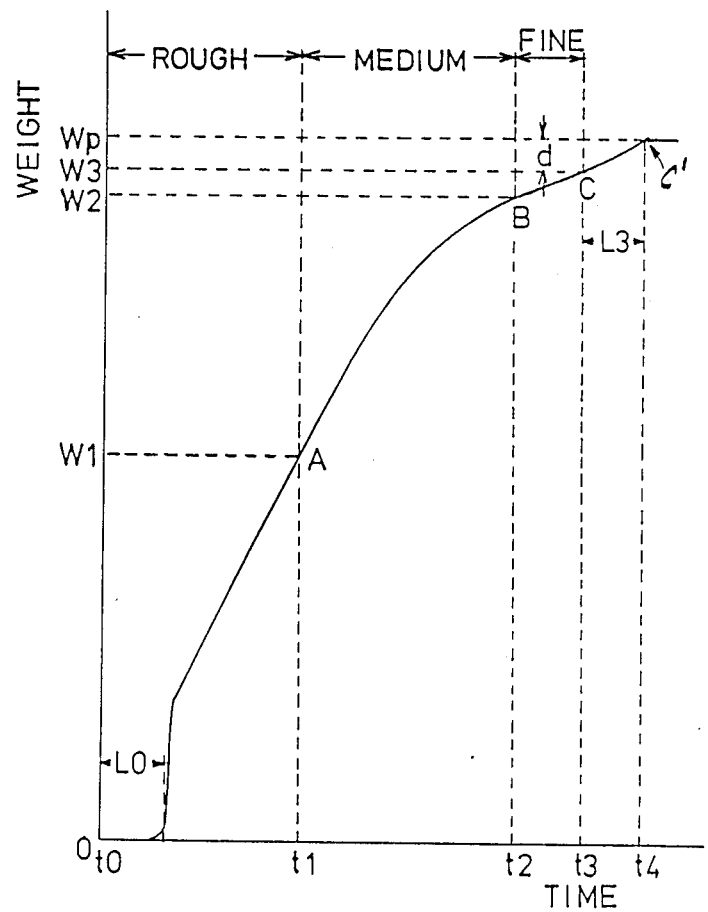

Now, the gate control operation of the arrangement of FIG. 3 will be described below with additional reference to FIGS. 4 and 5. When the discharge gate door 32 of the weigh hopper 16 is closed after discharge, a signal DG1 is applied from control section 28 through D/A convertor 24 to servo amplifier 14. Thus, the servo motor 10 drives the gate door 4 of retaining hopper 2 to open it to maximum aperture G1. Then, it is inquired in step 41 whether the current input weight signal DWx to control section 24 is equal to the present weight value DW1 or not. When a time L0 corresponding to the time for product to fall from the retaining hopper 2 to the weigh hopper 16 has passed after the door 4 was opened, the weight signal Wx begins to increase abruptly and soon reaches the preset value W1 at time t1 as shown in FIG. 5(b). Before time t1, steps 40 and 41 are repeated and the maximum aperture is maintained to effect "rough" feeding. When YES is obtained in step 41 at time t1, the gate aperture DGx is calculated in step 42 using Equation (2). Although this value is equal to DG1 at time t1, it decreases gradually as the weight Wx increases as shown. The aperture signal DGx is applied through D/A convertor 28 to servo amplifier 14 in step 43, so that the aperture of retaining hopper gate 4 is reduced correspondingly, thereby effecting variable "medium" feeding. It is then inquired in step 44 whether increasing DWx has reached the second preset value W2 or not and steps 42 to 44 are repeated if the answer is NO. When Wx reaches W2 at time t2 and YES is obtained in step 44, the aperture DGx is calculated as DG2 using Equation (2) and this value is applied to D/A convertor 28 in step 45. Thereafter, no calculation is effected on the value DGx and steps 45 and 46 are repeated until Wx reaches a third preset weight W3 at time t3. During this interval from t2 to t3, the gate aperture is kept constant to effect "fine" feeding. If YES is obtained in step 46 at time t3, a zero aperture signal G0 is applied to D/A convertor 28 to close the gate 4 in step 47. Even if the gate 4 is closed at time t3, Wx still increases for a time L3 corresponding to the falling time as aforementioned and becomes stable at time t4 as shown in FIG. 5. The result of FIG. 5, which is obtained by setting the exponent n of Equation (2) as 0.5, clearly minimize the aforementioned overshoot phenomena.

While the above description has been made in conjunction with a preferred embodiment, it should be noted that the invention is not limited thereto but various variations, modifications and changes can be made within the scope of invention as defined in the appended claims. For example, this method is applicable not only to combination weighers but also to any kind of weighers which need such feeding control. Although the gate aperture of retaining hopper was controlled in the above embodiment, this invention is applicable to any other feeding means such as screw feeders and vibration feeders in which the flow rate is controlled by controlling rotation speed and vibration amplitude. Moreover, the current weight of product can be detected by any means other than the weight sensor attached to the weigh hopper. For example, it may be detected as the weight of product discharged from the feeding device by a sensor attached to the latter.

What is claimed is:

1. A method of controlling a rate of feeding product to a weigher, comprising a first step of feeding product at a relatively large flow rate until the weight of product in the weigher reaches a predetermined first reference value, a second step of feeding product at a medium flow rate until the weight of product in the weigher reaches a predetermined second reference value, and a third step of feeding product at a relatively small flow rate until the weight of product in the weigher reaches a predetermined third reference value, characterized in that, in said second step, said medium flow rate is controlled in proportion to a power greater than 0 and less than 1 of the difference between said second reference value and the current weight of product in the weigher.

2. A method according to claim 1, characterized in that the exponent of said power is within the range from 0.3 to 0.7 inclusive.

3. A method according to claim 1, characterized in that said flow rate is controlled by controlling an exit gate aperture Gx of a feeding device, and said gate aperture is calculated by the following equation:

$$Gx = (G1 - G2)\left(\frac{W2 - Wx}{W2 - W1}\right)^n + G2 \quad (0 < n < 1)$$

where W1 and W2 are said first and second reference values, Wx is said current weight of product, and G1 and G2 are said gate apertures in said first and third steps, respectively.

4. Apparatus for feeding product to a weigh hopper adapted for weighing the product and providing a weight signal having a value representing the weight of the product in the weigh hopper, said apparatus comprising:
 a retaining hopper containing the product to be weighed located directly adjacent to the weight hopper, said retaining hopper having an aperture through which product in the retaining hopper is supplied to the weigh hopper;
 a control for providing a control signal representing the size of the aperture; means for controlling the size of the aperture in response to the control signal; and
 wherein the control varies the control signal such that the size of the aperture varies in proportion to a power greater than 0 and less than 1 of the value of the weight signal.

5. The apparatus of claim 4 wherein the exponent of said power is within the range of from 0.3 to 0.7 inclusive.

6. The apparatus according to claim 4, characterized in that said flow rate is controlled by controlling an exit gate aperture Gx of a feeding device, and said gate aperture is calculated by the following equation:

$$Gx = (G1 - G2)\left(\frac{W2 - Wx}{W2 - W1}\right)^n + G2 \; (0 < n < 1)$$

where W1 and W2 are said first and second reference values, Wx is said current weight of product, and G1 and G2 are said gate apertures in said first and third steps, respectively.

* * * * *